United States Patent [19]

Anderson

[11] 4,031,721
[45] June 28, 1977

[54] COMBINED ANTI-THEFT AND ADJUSTABLE MOUNTING ASSEMBLY FOR A CB RADIO DEVICE

[76] Inventor: Lyle V. Anderson, 122 Carriage Drive, Pittsburgh, Pa. 15237

[22] Filed: July 12, 1976

[21] Appl. No.: 704,525

[52] U.S. Cl. .................................. 70/58; 70/232; 70/DIG. 57; 248/203; 312/223
[51] Int. Cl.² .................... E05B 73/00; F16B 41/00
[58] Field of Search .............. 70/57, 58, 229, 230, 70/232, 258, 416, 53, 167, 171, DIG. 34, DIG. 56, DIG. 57, 13; 211/4; 248/203; 312/7 R, 223, 333 R, 246

[56] References Cited

UNITED STATES PATENTS

| | | | |
|---|---|---|---|
| 3,279,875 | 10/1966 | Witte | 312/333X |
| 3,370,446 | 2/1968 | Francis | 70/229 X |
| 3,410,122 | 11/1968 | Moses | 70/232 X |
| 3,563,070 | 2/1971 | Earl | 70/232 |
| 3,595,041 | 7/1971 | Leeper | 70/258 X |
| 3,673,828 | 7/1972 | Jones | 70/DIG. 57 X |
| 3,851,942 | 12/1974 | Clay | 312/333 |
| 3,945,227 | 3/1976 | Reiland | 70/DIG. 57 X |
| 3,965,705 | 6/1976 | Nadler | 70/13 X |
| 3,993,278 | 11/1976 | Race | 248/203 |

*Primary Examiner*—J. Franklin Foss
*Attorney, Agent, or Firm*—Brown, Murray, Flick & Peckham

[57] ABSTRACT

An anti-theft and adjustable mounting assembly to attach a CB radio transceiver onto the instrument cowl of a vehicle. Attached to the opposite sides of the casing of the CB radio device by threaded fasteners are U-shaped members which extend between the legs of complementally-shaped upstanding side members forming part of a U-shaped frame. Threaded shafts in stationary blocks are used to adjustably control the position of U-shaped spacer members and, hence, the CB radio transceiver relative to the upstanding side members. An open-ended housing receives the U-shaped frame while supporting the casing of a CB radio transceiver. An L-shaped cover spacer extends downwardly within the housing from the top wall to close any gap between the CB radio transceiver and the housing. A lock box on the housing receives a lug on the frame for interlocking engagement by a key-operated lock.

14 Claims, 2 Drawing Figures

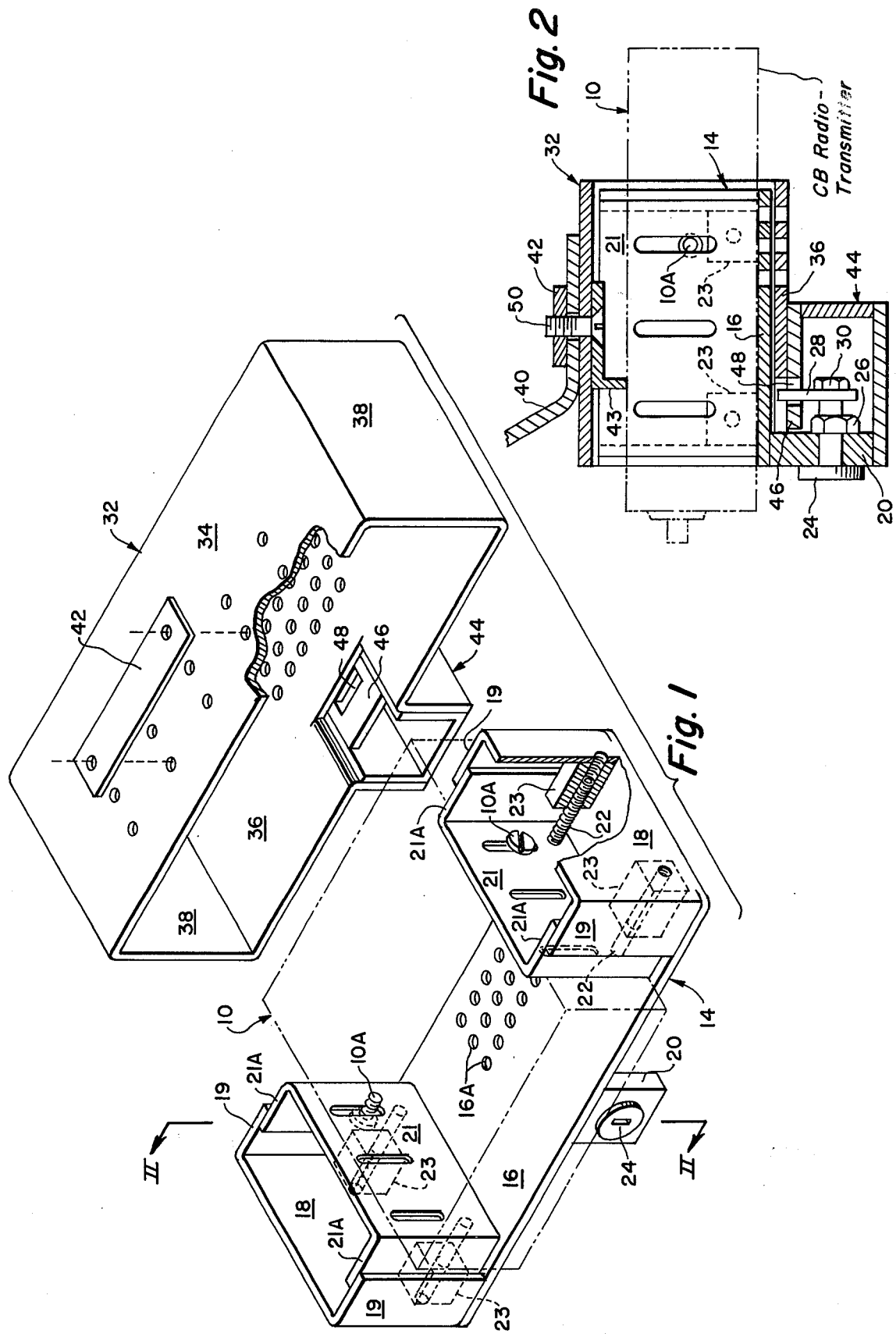

COMBINED ANTI-THEFT AND ADJUSTABLE MOUNTING ASSEMBLY FOR A CB RADIO DEVICE

BACKGROUND OF THE INVENTION

This invention relates to a combination anti-theft and adjustable mounting assembly for a citizen' band radio receiver and transmitter of the type adapted for operation within a vehicle, such as an automobile, truck or the like. More particularly, the present invention relates to an arrangement of parts to inhibit access to the threaded fastening members used for the support of any one of a number of radio receiving and transmitting devices having different physical dimensions; the arrangement of parts being such that the assembly is a deterrent to unauthorized removal of the radio receiver and transmitter while at the same time providing key-operated locking facilities to permit authorized removal of the receiver and transmitter.

It is the usual practice to mount a CB radio receiver and transmitter, hereinafter referred to for brevity sake as a CB radio tranceiver, by a support bracket onto a suitable support surface such as the marginal edge of sheet metal forming the lower portion of the instrument panel in an automobile. Typically, a U-shaped bracket was first attached to the cowling at a desired location. Threaded fasteners were then passed through holes in the bracket and into tapped holes in the sides of a CB radio transceiver. While a minimum of effort was required to install the CB radio transceiver, it is virtually just as simple to remove it which has given rise to a severe national problem of theft of CB radio transceivers. The fastening means, for example, are particularly susceptible to unauthorized access.

In my prior application, Ser. No. 661,313, filed Feb. 25, 1976, there is disclosed a combined anti-theft and mounting assembly for a CB radio device of which the present invention is an improvement thereon. While this prior device achieves the purpose for which it was intended, it nevertheless suffers from the disadvantage that it must be constructed with physical dimensions to accommodate the particular CB radio transceiver intended for use therewith. In other words, the disclosed anti-theft and mounting assembly is suitable for all CB radio transceivers having essentially the same physical dimensions. However, different-sized parts to form the assembly are needed to accommodate, for example, a smaller transceiver or otherwise it may fail to inhibit unauthorized access to the support bolts passed into the threaded holes at the sides of the CB radio transceiver. Thus, there is a need to provide a more universal mounting and anti-theft assembly to accommodate CB radio transceivers having a variety of different physical dimensions.

SUMMARY OF THE INVENTION

It is an object of the present invention to provide an adjustable mounting assembly for a CB radio transceiver which is constructed from an assembly of adjustably-related parts to provide a large degree of anti-theft protection against unauthorized removal of the transceiver.

It is further object of the present invention to provide a combination anti-theft and adjustable mounting assembly for a CB radio transceiver wherein the assembly includes spacer members adapted for attachment to the opposite sides of the casing for a CB radio transceiver which spacer members, together with the CB radio transceiver, are adjustably positioned relative to a carrier-type support member that is, in turn, capable of being locked within a housing.

It is a further object of the present invention to provide a mounting assembly including adjustable members to position and inhibit access to the fastening devices used to attach the CB radio transceiver to the assembly.

It is still another object of the present invention to provide a combination anti-theft and adjustable mounting assembly for a CB radio transceiver of the type adapted for operation within a vehicle, such as an automobile, wherein the assembly embodies a construction and robust arrangement of adjustable parts to provide a locked enclosure to inhibit against unauthorized access to the fastening devices employed to mount the entire assembly in place as well as other fastening devices used to attach and accommodate a CB radio transceiver that can have any one of a number of dimensional sizes.

In accordance with the present invention, there is provided a combined anti-theft and adjustable mounting assembly for the casing of a CB radio transceiver of the type adapted for attachment to and operable within a vehicle, such as an automobile or the like, the combination comprising a frame including spaced-apart, upstanding side members adapted to support the casing while forming a nested relation between the side members of the frame, spacer members adapted for attachment to the opposite sides of the casing for extending into an interlocking engagement with the side members at the opposite sides of the frame, means to position at least one of the spacer members relative to a side member, a housing forming an openended compartment to receive and support the frame together with the casing, the housing including a wall to carry fastening means for support by the vehicle at a desired location, a lock box having walls secured to the housing, and lock means carried by the frame to project into the lock box for interlocking the housing and the frame.

In the preferred form of the present invention, each of the upstanding side members includes spaced-apart legs projecting toward the other side member. Each spacer member preferably includes spaced-apart legs to project into an interlocking engagement between the legs of a side member. The aforementioned means to position at least one of the spacer members relative to a side member preferably includes blocks carried by the floor of the frame member in a spaced-apart relation adjacent the side members and a member threadedly carried by each block for adjustably positioning an associated spacer member as well as the casing of the CB radio transceiver between the side members of the frame. The combination of parts further includes in its preferred form a cover spacer having an L-shaped configuration in cross section adapted for support by the aforementioned housing means to extend into a closely-spaced relation with the top surface of the casing forming the CB radio transceiver.

These features and advantages of the present invention as well as others will be more fully understood when the following description is read in light of the accompanying drawings, in which:

FIG. 1 is an exploded perspective view of the parts forming the anti-theft and adjustable mounting assembly according to the present invention; and FIG. 2 is a sectional view taken along line II—II of FIG. 1.

In FIGS. 1 and 2, reference numeral 10 identifies a CB radio transceiver which, according to the features and advantages of the present invention, can be selected from any one of a number of standard commercially-available units. It will be understood, of course, that presently-available CB transmitter-receiver units vary in regard to their physical dimensions from unit-to-unit. The typical dimensions of a CB unit are 7 inches deep, 6 inches wide and 2 inches high. However, the principal aim and concept of the present invention are to provide an adjustable mounting assembly to accommodate significantly different widths and heights of CB units that may vary over a range from unit-to-unit.

The apparatus of the present invention includes a U-shaped frame 14 formed by a bottom plate 16 having upstanding, spaced-apart side members 18 projecting from one side of the plate 16 and a lug 20 projecting from the other side of the plate. As shown in FIG. 1, the lug 20 projects downwardly at a central location from the front edge of the plate 16. Each side member 18 includes an upstanding end plate with spaced-apart legs 19 projecting horizontally from the opposite sides of the end plate along the plate 16. The legs 19 of one side member extend toward the legs of the other side member. The space between the terminal edges of the legs 19 at opposite sides of the frame is selected so as to exceed the width of a CB unit 10 to be supported by the assembly. Spacer members 21 have vertically-extending slotted holes at spaced locations across their width for receiving threaded fastening means such as bolts 10A passed through the spacer members into existing tapped mounting holes in the casting of the CB unit. No alterations to the CB unit are required. Each spacer member includes horizontally-extending legs 21A which are spaced apart by a distance so as to pass into the space between the legs 19 of the side members and form an interlocking relation therewith. The position of the spacer member relative to a side member is controlled by the adjustable positioning of two set screws 22 which are threadedly received in tapped holes formed in spaced-apart support blocks 23. As clearly shown in FIG. 1, the support blocks 23 are carried by the plate 16 and abut against the inside surface of the upstanding side member 18. The side members have annular openings aligned with the tapped holes in the support blocks 23 for an adjustment tool used to adjust the position of each set screw 22. In light of the foregoing description, an obvious modification, within the scope of the present invention, is to mechanically attach the extended ends of the set screws 22 to the inside face surface of one spacer member 21. This eliminates the need to employ set screws to contact the other spacer member. In this modification, the single pair of set screws is adjusted to push and/or pull the CB unit together with both spacer members while nested within the U-shaped frame 14.

The parts thus far described are put into an operative relation by first attaching the spacer members via one of the slotted holes by bolts 10A to existing tapped holes on opposite sides of the CB radio transceiver. The CB radio transceiver, together with the spacer members, are then positioned vertically into a nested and supported relation with the frame 14 wherein the legs of the spacer member project between the legs of the side members. The set screws 22 at one or both sides of the side members are adjustably positioned so that their extended ends abut against the inside face surface of the spacer members. This also enables lateral positioning of the CB radio transceiver with respect to the frame 14. It is preferred to provide, as shown in FIG. 1, an array of perforated openings 16A in the place 16 to facilitate the transmission of sound from the CB radio transceiver when it includes a speaker assembly in the bottom wall thereof.

The lug 20 is employed as the support for a keyoperated lock assembly 24. As can be clearly seen in FIG. 2, the lug has an annular bore into which the lock assembly 24 is received and secured in place by a nut 26. A radially-extending latch plate 28 is secured by a nut 30 against a shoulder on the control shaft of the lock assembly 24.

The U-shaped frame 14 is dimensioned to slide in a closely-spaced relation within an open-ended compartment formed by a housing 32. The housing has a depth which is greater than the corresponding dimension of the U-shaped frame 14 so that the housing encloses and thereby prevents access to all fastening means exposed to the interior of the housing. The housing includes a top wall 34, a bottom wall 36 and side walls 38. The top wall 34 has two aligned rows of spaced-apart openings used to pass the threaded ends of machine screws 50 into similarly-arranged holes formed in an exposed marginal edge of the instrument panel 40 and thence into the threaded holes within a plate 42. The plate 42 extends in the direction of the length of the top wall 34. As an alternative, the housing 32 may be secured by machine screws 50 and plate 42 to virtually any exposed structural surface in an automobile, such as existing surfaces in the trunk compartment. The housing 32 can be attached onto a suitable surface of a motorcycle, boat, truck, etc. In the event the height of a CB radio transceiver is significantly less than the dimension between the top wall 34 of the housing and the bottom wall 16 of the frame 14, then according to an auxiliary feature of the present invention there is provided a cover spacer 43 which has an L-shaped configuration and provided with a series of aligned openings to receive the machine screws 50 used to attach the housing to the instrument panel. The cover spacer 43 has a length such that it extends between the spacer members 21 at opposite sides of the CB radio transceiver. The use of the L-shaped cover spacer further inhibits unauthorized access to all fastening means used to support the entire assembly within the vehicle. The bottom wall 36 includes an array of perforated openings for alignment with the perforated openings 16A in plate 16. Bottom wall 36 and plate 16 have substantially the same depth.

To enable authorized removal of the CB radio transceiver, such as, for example, use of the CB radio transceiver within the owner's home or other location, the bottom wall 36 of the housing 32 supports a lock box 44 suitably formed with side and bottom walls. The lock box has an open front that is dimensioned to receive the lug 20 when the frame 14 is supported within the compartment provided by the housing 32. The thickness of the lug 20 is substantially increased as compared to the thickness of the side walls of the lock box. The arrangement of parts is such as to deter and prevent forced entry into the interior of the lock box, housing 32 or frame 14. The lock box further includes a top wall 46 that defines a slotted opening 48 positioned and dimensioned to receive the lock arm 28 to form an interlocking relation between the frame 14 and housing 32. The interlocking relation is clearly shown by the position of the parts in FIG. 2.

In light of the foregoing description, it is apparent that the lug 20 and the lock box 44 may be arranged at other locations as desired. Thus, for example, the lug 20 may be supported by a side plate 18 of the frame 14 to cooperate with a lock box supported by the side walls 38 of the housing 32. It is believed clearly apparent that the enclosing shape of the housing 32 prevents access to bolts 10A used to attach the spacer members to the CB radio transceiver while supported by the frame 14 as well as set screws 22 and machine screws 50. Moreover, when the CB radio transceiver, together with the frame 14, are positioned within the housing 32 and interlocked therewith by the lock device, it is now possible to insure a close, tight-fitting relationship of parts that avoids unwanted noise caused by movement between loosely-fitting parts.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A combined anti-theft and adjustable mounting assembly for the casing of a CB radio receiver and transmitter of the type adapted for attachment to and opearable within a vehicle such as an automobile or the like, the combination comprising:
   a frame including spaced-apart, upstanding side members adapted to support said casing while forming a nested relation between the side members of the frame,
   spacer members adapted for attachment to the opposite sides of said casing for extending into an interlocking engagement with said side members at the opposite sides of said frame,
   means to position at least one of said spacer members relative to a side member,
   a housing forming an open-ended compartment to receive and support said frame together with said casing, said housing including a wall to carry fastening means for support by the vehicle at a desired location,
   a lock box having walls secured to said housing, and lock means carried by said frame to project into said lock box for interlocking said housing and said frame.

2. The combination according to claim 1 wherein each of said upstanding side members includes spaced-apart legs projecting toward the legs of the other side member.

3. The combination according to claim 2 wherein said spacer members include leg members extending into an interlocking relation between legs of the side members on said frame.

4. The combination according to claim 1 wherein said means to position at least one of said spacer members includes adjustment members threadedly supported in a spaced-apart relation to position one of said spacer members relative to a side member.

5. The combination according to claim 4 further comprising support means carried by said frame for threadedly receiving said adjustment members.

6. The combination according to claim 1 wherein said spacer members include a plurality of spaced-apart elongated openings arranged for selective use to secure via threaded fastening means the spacer members onto opposite sides of said casing, said upstanding side members including spaced-apart legs projecting toward the legs of the other side member, said spacer members including legs arranged to extend into the space between the legs of said side members.

7. The combination according to claim 1 further comprising a cover spacer adapted for support by the top wall of said housing to extend therefrom into a closely-spaced relation with said casing while supported by said frame within said housing.

8. The combination according to claim 1 further comprising a lug projecting outwardly from said frame, an opening in the wall of said lock box to form an open passageway therein for receiving said lug, said lock means including a lock plate adapted to extend into said lock box to prevent relative movement between said frame and said housing.

9. The combination according to claim 8 wherein said lug projects downwardly from said bottom plate when said side members project upwardly therefrom.

10. The combination according to claim 1 wherein said frame has a bottom plate for interconnecting said side members to form a U-shaped configuration, said side members each including spaced-apart legs extending along said bottom plate such that the space between said side members is greater than the width of said casing, said spacer members each including spaced-apart legs projecting away from said casing when the spacer member is attached thereto, the distance between the projected ends of the spacer members at opposite sides of said casing being greater than said distance between the legs of the spaced-apart side members.

11. The combination according to claim 1 further comprising an elongated plate member adapted to extend along in the length of said wall of said housing for supporting said fastening means.

12. The combination according to claim 11 wherein said elongated plate member is adapted to carry at least two spaced-apart fastening members.

13. The combination according to claim 11 wherein said elongated plate member has two spaced-apart threaded openings to support fastening members projecting from said housing.

14. The combination according to claim 1 wherein said frame and said housing have substantially the same depth, the bottom walls of the frame and housing each having an array of openings for transmission of sound from said CB radio receiver and transmitter.

* * * * *